United States Patent Office 2,941,922
Patented June 21, 1960

2,941,922
INSECTICIDAL COMPOSITIONS

Philip Gerolt, Herne Bay, England, assignor to Shell Oil Company, a corporation of Delaware No Drawing. Filed May 6, 1957, Ser. No. 657,062

Claims priority, application Great Britain May 7, 1956

11 Claims. (Cl. 167—42)

This invention relates to insecticidal compositions for use on sorptive surfaces and more specifically to halogenated polycyclic insecticides such as aldrin, dieldrin, isodrin and endrin which manifest surprisingly superior residual insecticidal toxicity when admixed with an asphaltite such as gilsonite.

In the past, insecticidal mixtures have been sprayed or otherwise deposited on surfaces possessing sorptive properties. It has been found, however, that these mixtures soon lose their insecticidal potency. In hot, dry, tropical and subtropical areas, where the interior mud walls of native huts are treated with insecticidal sprays to eliminate disease carrying insects diminution of potency is particularly acute. The need for an insecticidal composition evidencing extended residual toxicity when applied to sorptive surfaces such as mud walls has consequently become increasingly manifest. Yet in spite of intensive research in the past this urgent need has remained unsatisfied.

It is, consequently, the principal object of the present invention to provide insecticidal compositions which manifest extended residual activity when placed on sorptive surfaces such as mud walls.

Another object of the present invention is to provide a method for formulating insecticidal compositions which manifest extended residual activity.

Still another object of the present invention is to provide a method of combating insect pests in tropical areas comprising essentially the application of an insecticidal composition possessing significant residual toxicity to the sorptive surfaces upon which these insect pests commonly alight.

Other objects, features and advantages of the present invention will be apparent from the following description read in conjunction with the appended claims.

The deactivation of insecticidal spray residues is due to the migration of the insecticidal component from the surface to the inner layers of the treated material where its contact insecticidal action can no longer be effectively manifested. In this manner, the residues of both volatile and non-volatile insecticides lose their activity. The cause of this migration is not yet known, but appears to be connected with some power of the sorptive material to attract the molecules of the insecticidal substance. This diminution of insecticidal potency by migration is not to be confused with diminution due to evaporation of insecticides having relatively high vapor pressures. The difference between these two phenomena will be immediately obvious to those well versed in the art.

Of recent years aldrin, endrin, isodrin, and particularly dieldrin have been increasingly used as the active ingredient in residual insecticidal sprays. Aldrin is the name of a product consisting essentially of 1,2,3,4,10,10-hexachloro - 1,4,4a,5,8,8a - hexahydro - 1,4,5,8a - endo, exo-dimethanonaphthalene. Isodrin is the name of a product consisting essentially of the stereoisomer of aldrin having the endo, endo configuration. Dieldrin is the name of a product consisting essentially of the 6,7-epoxy derivative of aldrin, and endrin is the name of a product consisting essentially of the endo, endo isomer of dieldrin. These insecticides have been found to rapidly lose their insecticidal potency when applied to absorbent or adsorbent surfaces.

It has now been discovered that the deactivation of residues of dieldrin as well as other halogenated polycyclic insecticides when applied to the surfaces of material with sorptive properties, can be substantially inhibited if the insecticidal substance is in intimate contact or intimate admixture with an asphaltite such as gilsonite. The attraction for the molecules of insecticidal substance exerted by the asphaltite is very much greater than that exerted by the sorptive material. The insecticidal substance is consequently held on the surface of the treated material where it can continue to exert its insecticidal activity.

This discovery is of the greatest importance when considered with reference to the current campaign to eliminate malaria carrying mosquitos in tropical areas. This campaign aims at breaking the chain of malaria transmission by spraying dwelling houses in malarial zones with insecticide. In order to break this chain of transmission, however, the active insecticidal agent must remain active for an extended time period. Though the halogenated polycyclic insecticides such as dieldrin evidence satisfactory residual toxicity for some purposes, they are unsatisfactory when prolonged residual toxicity on sorbent surfaces is essential. The discovery that the intimate admixtures, particularly the solid solutions, of the present invention maintain residual insecticidal toxicity for very extended periods of time, even when applied to these surfaces, consequently fills an urgent need in an altogether unique yet highly efficient manner.

Asphaltites are generally defined as naturally occurring asphalt-like substances, characterized by their high fusing points (over 230° F.). They are grouped into three classes; gilsonite, glance pitch and grahamite. Because all are derived from petroleum, these classes tend to merge into one another. Generally speaking, however, gilsonite may be defined as an asphaltite which has a specific gravity of approximately 1.03–1.10 at 77° F., a softening point of about 230–350° F. and a fixed carbon content in the vicinity of 10–20%. Gilsonite is further classified into a standard grade and a select grade both of which may be employed for the purposes of the present invention. Gilsonite select is a brownish-black, naturally occurring asphaltite having a softening point of 275° F. Gilsonite standard has a softening point of about 340° F.

Intimate contact between the insecticidal substance and the gilsonite may be effected by grinding the two components together. Contact between the insecticidal substance and the gilsonite is considerably improved with corresponding increase in the residual toxicity if a solution of the two components in an organic solvent is evaporated to dryness. The solid residue thus obtained is subsequently powdered. The greatest improvement in residual toxicity is obtained however, when the insecticidal substance and the gilsonite are brought into intimate contact in a homogeneous molten mixture of the two components. A solid solution can be formed by so melting the components.

The intimate mixtures of insecticide and gilsonite thus formed are vastly superior to the intimate mixtures made by grinding or by evaporation from an organic solvent and constitute the preferred compositions of this invention. The present invention encompasses both saturated, supersaturated and unsaturated mutual solid solutions of a halogenated polycyclic insecticide such as dieldrin and an asphaltite such as gilsonite. Of course it will be readily understood that other intimate homogeneous mixtures of halogenated polycyclic insecticide and asphaltite such as those prepared by grinding or by evaporation from an organic solvent are also within the scope of the present invention.

25% by weight gilsonite is required in the final formulation to greatly prolong the residual life of dieldrin wettable powders. Those formulations having less than 10% gilsonite by weight do not appear to extend the residual life of dieldrin, particularly on dry mud surfaces, as effectively as formulations containing higher quantities of the asphaltite. This is particularly true of compositions containing less than about 5% by weight gilsonite. Formulations containing substantially more than about 60% gilsonite by weight are also considered of less value. As the quantity of gilsonite employed in the formulation is increased, storage stability under tropical conditions with respect to suspendibility tends to decrease.

The ratio of gilsonite to insecticide may vary considerably. It has been found desirable, however, to employ wettable powders having a ratio of gilsonite to insecticide not in excess of 5:1, preferably 3:1. It will be readily understood, however, that both the quantity of gilsonite in the final formulation and the ratio of gilsonite to insecticide in the formulation may vary somewhat without departing from the scope of the invention. Thus the range of gilsonite to insecticide may vary commonly in the formulations from 1:2 to 5:1. A preferred range of gilsonite to insecticides is 1:2 to 2:1. A ratio of gilsonite to insecticide of 1:2 appears most preferable.

In making an intimate admixture containing an asphaltite such as gilsonite and an insecticide such as dieldrin several alternative mixing steps may be satisfactorily employed. Thus the resin and toxicant may be premixed as powders and subsequently melted. It is also possible to melt each constituent separately and mix the molten mass. A third alternative is to melt together solid insecticide and solid asphaltite. Yet another alternative is to mix liquid insecticide with the asphaltite in a softened condition and subsequently heat. In this connection it should be kept in mind that insecticides such as dieldrin possess melting points lower than that of gilsonite. Though these initial mixing steps have been specifically set forth it will be readily understood that the invention is not restricted to these steps but also contemplates their modification as well as alternative steps whereby the asphaltite is brought into intimate admixture with the insecticide. In all cases, fusion of the components while in intimate admixture is considered essential.

The period of time during which the asphaltite and insecticide are mixed and the temperature maintained during the mixing step may vary considerably without departing from the scope of the invention. Generally speaking the temperature must not exceed the temperature of decomposition of the toxicant nor be so low as to adversely affect the homogeneity of the mixture. A temperature range of approximately 240° F. to approximately 400° F. may be employed. A temperature range of about 300° F. to about 350° F. has been found preferable. The period time for this mixing step may vary with the components of the mix, the manner of mixing, and the temperature maintained during the mixing step. Thus, intimate admixture of resin and insecticide has been accomplished in less than 6 minutes when the components were melted separately and subsequently mixed. On the other hand intimate admixture of resin and insecticide has been brought about by melting premixed powders for a period of 7 hours. A period of 2 hours is generally considered optimum.

The resulting melt which is rapidly cooled to room temperature exhibits the property of cold flow and tends to coalesce after sheets of the insecticidal composition are piled on top of one another even for a short period of time. If this rubbery mixture is held at room temperature for one to three weeks it becomes cured and is hard and brittle. In this condition it may be stored without objectionable sticking or compacting. From a production standpoint, however, an extended storage period is considered objectionable. An alternative step for avoiding this storage period has consequently been developed.

It has been found that maintaining the melt at temperatures below the pour point of the melt increases the rate of the cure. For example a holding time of about 30 to 60 minutes at approximately 60° to 100° F. followed by cooling to room temperature resulted in a highly brittle dieldrin-gilsonite product similar to that obtained after one week of storage at room temperature. The curing temperature may generally vary from about 60° F. to about 190° C. However it is preferable to maintain a curing temperature below 130° F. and higher than room temperature. Within this temperature range the period of curing varies with the past history of the melt as well as other factors. Thus a 2:1 dieldrin-gilsonite melt prepared by adding molten gilsonite to molten dieldrin, mixing for two hours at about 355° F., and pan cooling, was cured in 2 days at a temperature of about 170° F. At a curing temperature of about 75° F. a similar melt required over 35 days to cure. In another case a pre-mixed powder of dieldrin-gilsonite which was melted at about 270° F. for 30 minutes required a curing time of 4 days at a curing temperature of 70° F. Another pre-mixed powder of dieldrin-gilsonite which was melted at about 370° F. for 95 minutes required a curing time of over 30 days at a curing temperature of 70° F.

Numerous dieldrin formulations containing approximately 5.6 to 24.9% w. gilsonite have been made from melts prepared in accordance with this procedure. The powders may be prepared by hammer-milling and air-milling. It has been found helpful to chill the formulations containing 24.9% w. gilsonite with Dry Ice prior to milling because the formulations tend to soften in the hammer mill and to jam the screw-type feeding devices of both the hammer mill and air mill.

Examples of dieldrin-gilsonite formulations encompassed by the present invention are shown in the following table:

*Dieldrin-gilsonite formulations*

[Composition, Percent w.]

| Sample Number | Dieldrin | Gilsonite | Marasperse CB | Duponol ME | Dry Attaclay (5% urea) |
|---|---|---|---|---|---|
| 1 | 50.0 | 25.0 | 3.0 | 2.0 | 20.0 |
| 2 | 50.0 | 30.0 | 6.0 | 1.0 | 13.0 |
| 3 | 50.0 | 30.0 | 6.0 | 1.0 | 13.0 |
| 4 | 50.0 | 30.0 | 6.0 | 1.0 | 13.0 |
| 5 | 50.0 | 40.0 | 6.0 | 1.0 | 3.0 |
| 6 | 40.0 | 30.0 | 6.0 | 1.0 | 23.0 |
| 7 | 40.0 | 50.0 | 6.0 | 1.0 | 3.0 |
| 8 | 30.0 | 40.0 | 6.0 | 1.0 | 23.0 |
| 9 | 30.0 | 60.0 | 6.0 | 1.0 | 3.0 |

These formulations were prepared by forming a melt of dieldrin-gilsonite; cooling the molten mass; grinding the hardened melt; adding the Marasperae CB, Duponol ME, and Attaclay with 5% urea; and hammer-and-air milling. If desired, formulations of this type may then be after-blended to insure homogeneous mixture. Marasperse CB is a highly purified, partially desulfonated sodium lignosulfonate; a dispersant for wettable powder insecticides. Duponol ME is a fatty alcohol sulfate which is commonly employed as an emulsifying and dispersing agent. Attaclay is a highly efficient carrier, diluent, extender and conditioner commonly employed in insecticidal concentrates.

The following table gives the results of biological testing of formulations shown above as compared to a conventional wetting powder:

*Test of dieldrin wettable powders made from high ratio gilsonite melts*

[Dieldrin applied at rate of 25 mg. per sq. ft. on 9 cm. mud blocks.]

| Sample Number | Melt Ratio [a] Dieldrin: Gilsonite | Percent Gilsonite in w. p. | Percent Mortality—House Flies | | | | |
|---|---|---|---|---|---|---|---|
| | | | Fresh Deposit | 1 day | 2 days | 1 week | 2 weeks |
| | Standard 50% wettable powders | 0 | 100 | 85 | 7 | 14 | 12 |
| 2 | 62.5:37.5 | 30 | 100 | 99 | 84 | 100 | 60 |
| 3 [b] | 62.5:37.5 | 30 | 100 | 100 | 92 | 100 | 100 |
| 4 [c] | 62.5:37.5 | 30 | 100 | 98 | 94 | 100 | 100 |
| 5 | 55.6:44.4 | 40 | 100 | 100 | 100 | 100 | 80 |
| 6 | 57.1:42.9 | 30 | 100 | 95 | 91 | 97 | 100 |
| 7 | 44.4:55.6 | 50 | 100 | 99 | 98 | 98 | 100 |
| 8 | 42.9:57.1 | 40 | 100 | 99 | 99 | 100 | 100 |
| 9 | 33.3:66.7 | 60 | 99 | 100 | 100 | 100 | 100 |
| 10 | 62.5:37.5 | 30.3 | 100 | | | 100 | 98 |

[a] Quick-cooled, except where noted (cooled by immersion of container in Dry Ice).
[b] Intermediate-cooled (cooled at room temperature).
[c] Slow-cooled (cooled over steam bath at 80–100° C).

One very excellent dieldrin-gilsonite formulation consists of:

| | Percent by weight |
|---|---|
| Technical dieldrin | 50.5 |
| Gilsonite "select" | 30.0 |
| Attaclay | 9.4 |
| Urea | 2.1 |
| Duponol ME dry | 1.0 |
| Maraspersе CB | 6.0 |
| Sodium tripolyphosphate | 1.0 |
| Total | 100.0 |

Another formulation of promise consists of:

| | Percent by weight |
|---|---|
| (100% purity) technical dieldrin | 50.5 |
| Gilsonite "select" | 24.9 |
| Attaclay | 15.8 |
| Urea | .8 |
| Maraspersе CB | 6.0 |
| Duponol ME dry | 1.0 |
| Sodium tripolyphosphate | 1.0 |
| Total | 100.0 |

The toxicity of dieldrin and dieldrin-gilsonite wettable powders encompassed by the present invention is further evidenced by the following table. All samples tested contained urea, Duponol ME dry, Maraspersе CB and sodium tripolyphosphate.

*Toxicity tests of 50% dieldrin and dieldrin-gilsonite wettable powders*

[Dieldrin applied at 25 mg. per sq. ft. on 9 cm. mud panels.]

| Formulation | Ratio, Dieldrin-Gilsonite | Average Percent 24-Hours Mortality—House Flies | | | | | | |
|---|---|---|---|---|---|---|---|---|
| | | Fresh | 1 day | 2 days | 7 days | 14 days | 21 days | 28 days |
| Standard 50% wettable powder | 100:0 | 100 | 85 | 7 | 14 | 12 | 8 | 8 |
| melt | 90:10 | 100 | 5 | 10 | 16 | 3 | 19 | 17 |
| melt | 83:17 | 94 | 44 | 12 | 18 | 6 | 21 | 24 |
| melt | 67:33 | 100 | 100 | 100 | 98 | 54 | 18 | 27 |
| blend [a] | 67:33 | 100 | 60 | 33 | 27 | 42 | 26 | 11 |

[a] The gilsonite, dieldrin, Maraspersе CB and Attaclay were powdered, hammer-and-air-milled.

A comparison was made of the behavior of dieldrin-gilsonite physical mixtures and dieldrin-gilsonite melts, both containing equal amounts of the two components, together with wetting and suspending agents but no fillers. The following table shows the results obtained with these formulations. The dosage was 25 mg. dieldrin/sq. ft.

*Percentage knockdown and 24-hour mortality (percent) of Musca domestica after 30 seconds' exposure to residues of dieldrin/gilsonite, 50:50, on mud panels*

| Experimental Formulations of Dieldrin/Gilsonite, 50:50 | Age of Residues | Number of Hours After Exposure | | | | | | |
|---|---|---|---|---|---|---|---|---|
| | | 1½ | 2 | 3 | 4 | 5 | 6 | 24 |
| Physical mixture [a] | 2 hours | 9 | 51 | 65 | 93 | 100 | | 100 |
| | 2 weeks | 14 | 33 | 71 | 86 | 100 | | 100 |
| | 1 month | 0 | 10 | 29 | 39 | 58 | 84 | 100 |
| | 2 months | 6 | 12 | 14 | 35 | 38 | 50 | 100 |
| | 3 months | 0 | 0 | 5 | 20 | 30 | 50 | 100 |
| Melt [b] | 2 hours | 15 | 50 | 91 | 97 | 97 | | 97 |
| | 2 weeks | 29 | 42 | 82 | 95 | 100 | | 100 |
| | 1 month | 9 | 21 | 53 | 85 | 100 | | 100 |
| | 2 months | 11 | 36 | 72 | 92 | 97 | 100 | 100 |
| | 3 months | 0 | 0 | 19 | 49 | 91 | 98 | 100 |

[a] The dieldrin and gilsonite were mixed, hammer-and-air-milled and diluents added.
[b] The dieldrin and gilsonite were melted, diluents added and hammer- and air milled.

The insecticidal activity of the formulations of this invention before and after storage is evidenced by the following experiments.

A formulation containing 50% dieldrin, 30% gilsonite by weight (melt) and a 20% by weight mixture of fuller's earth and china clay in a 1:1 proportion together with wetting agents was retested after storage for a period of two months at 20° C. The results, presented in the following table, clearly show that storage at 20° C. for two months did not affect the biological performance of this formulation on mud under the experimental conditions.

*Percentage knockdown and 24-hour mortality of Musca domestica after 30 seconds' exposure to residues of dieldrin/gilsonite/filler (before and after storage) on mud panels*

| Storage Conditions | Age of Residue | Number of Hours After Exposure | | | | | | |
|---|---|---|---|---|---|---|---|---|
| | | 1½ | 2 | 3 | 4 | 5 | 6 | 24 |
| Fresh | 2 hours | 53 | 100 | | | | | 100 |
| | 2 weeks | 68 | 98 | 100 | | | | 100 |
| | 1 month | 48 | 76 | 100 | | | | 100 |
| | 2 months | 15 | 37 | 63 | 93 | 100 | | 100 |
| | 3 months | 0 | 0 | 32 | 61 | 100 | | 100 |
| 2 months at 20° C. | 2 hours | 52 | 100 | 100 | | | | 100 |
| | 2 weeks | 30 | 88 | 97 | | | | 100 |
| | 1 month | 31 | 81 | 57 | 100 | | | 100 |
| | 2 months | 5 | 29 | 48 | 90 | 98 | 100 | 100 |
| | 3 months | 0 | 0 | | 72 | 90 | 97 | 100 |

In another experiment an air-milled product containing 50% by weight dieldrin, 25% by weight gilsonite (melt) and 25% by weight Microcel and wetting agent was tested under the following storage conditions:

a. One week at 20° C.
b. One day at 55° C. (tropical storage test) and one week at 20° C.
c. Seven weeks at 20° C.
d. Three weeks at 20° C. and four weeks at 30° C.
e. Three weeks at 20° C. and four weeks at 40° C.

At the end of the storage period samples of the formulations were sprayed on mud panels (25 mg. dieldrin/sq. ft.), which were then tested on houseflies at successive intervals as indicated in the following table. This specific formulation appears to work best at temperatures not in excess of 30° C. Other formulations have been found to maintain their biological activity for extended periods of time at temperature well in excess of 30° C.

*Percentage knockdown and 24-hour mortality of Musca domestica after 30 seconds' exposure to residues of dieldrin/gilsonite/filler (stored under various temperature conditions on mud panels)*

[Formulation: dieldrin/Gilsonite/microcel 50:25:25 (air-milled)]

| Storage Conditions | Age of Residue | Number of Hours After Exposure | | | | | | |
|---|---|---|---|---|---|---|---|---|
| | | 1½ | 2 | 3 | 4 | 5 | 6 | 24 |
| 1 week at 20° C | 2 hours | 69 | 97 | 100 | | | | 100 |
| | 2 weeks | 3 | 42 | 94 | 100 | | | 100 |
| | 1 month | 6 | 28 | 59 | 81 | 90 | 97 | 100 |
| | 2 months | 0 | 7 | 31 | 74 | 98 | 100 | 100 |
| 1 day at 55° C, 1 week at 20° C | 2 hours | 100 | | | | | | 100 |
| | 2 weeks | 0 | 0 | 0 | 29 | 29 | 54 | 100 |
| | 1 month | 0 | 0 | 6 | 29 | 43 | 60 | 100 |
| | 2 months | 0 | 0 | 0 | 0 | 6 | 16 | 94 |
| 7 weeks at 20° C | 2 hours | 81 | 100 | | | | | 100 |
| | 2 weeks | 0 | 31 | 78 | 94 | 100 | | 100 |
| | 1 month | 6 | 24 | 56 | 68 | 82 | 91 | 100 |
| | 2 months | 0 | 0 | 16 | 50 | 74 | 94 | 100 |
| 3 weeks at 20° C, 4 weeks at 30° C | 2 hours | 95 | 100 | | | | | 100 |
| | 2 weeks | 0 | 31 | 72 | 90 | 97 | 100 | 100 |
| | 1 month | 0 | 0 | 23 | 45 | 55 | 70 | 100 |
| | 2 months | 0 | 0 | 12 | 44 | 68 | 85 | 100 |
| 3 weeks at 20° C, 4 weeks at 40° C | 2 hours | 98 | 100 | | | | | 100 |
| | 2 weeks | 0 | 0 | 0 | 4 | 11 | 39 | 100 |
| | 1 month | 0 | 0 | 0 | 0 | 9 | 22 | 96 |
| | 2 months | 0 | 0 | 0 | 0 | 0 | 0 | 75 69 |

It will be readily understood that other diluents and surface active agents than those specifically named may be successfully employed in the insecticidal compositions of the present invention. Thus among the many diluents and carriers which may be successfully employed are the diatomites such as diatomaceous earth, calcium limes, calcites, dolomites, gypsum, mica, talc, pyrophyllites, members of the montmorillonoid group such as bentonite, kaolinites, attapulgites as well as other naturally occurring and synthetic diluents and carriers. It will also be evident that the extent of the dilution may vary considerably without departing from the scope of the invention and that the invention is not limited to 50% wettable powders. Moreover, the specific quantities of insecticide and asphaltite employed are only to be construed as limited by the following claims.

The embodiments of the invention in which an exclusive property or privilege is claimed are defined as follows:

1. An insecticidal composition comprising an intimate homogeneous mixture of a chlorinated polycyclic compound selected from the group consisting of aldrin, isodrin, dieldrin and endrin, and an asphaltite, the ratio of said asphaltite to said polycyclic compound ranging between 1:2 and 5:1.

2. An insecticidal composition comprising an intimate homogeneous mixture of dieldrin and an asphaltite, the ratio of said asphaltite to said dieldrin ranging between 1:2 and 5:1.

3. An insecticidal composition comprising an intimate homogeneous mixture of endrin and an asphaltite, the ratio of said asphaltite to said endrin ranging between 1:2 and 5:1.

4. An insecticidal composition comprising an intimate homogeneous mixture of isodrin and an asphaltite, the ratio of said asphaltite to said isodrin ranging between 1:2 and 5:1.

5. An insecticidal composition comprising an intimate homogeneous mixture of aldrin and an asphaltite, the ratio of said asphaltite to said aldrin ranging between 1:2 and 5:1.

6. An insecticidal composition comprising a solid solution of a chlorinated polycyclic compound selected from the group consisting of aldrin, isodrin, dieldrin and endrin, and gilsonite, the ratio of said gilsonite to said polycyclic compound ranging between 1:2 and 5:1.

7. An insecticidal composition comprising a solid solution of dieldrin and gilsonite, the ratio of said gilsonite to said dieldrin ranging between 1:2 and 5:1.

8. An insecticidal composition comprising a solid solution of endrin and gilsonite, the ratio of said gilsonite to said endrin ranging between 1:2 and 5:1.

9. An insecticidal composition comprising a solid solution of isodrin and gilsonite, the ratio of said gilsonite to said isodrin ranging between 1:2 and 5:1.

10. An insecticidal composition comprising a solid solution of aldrin and gilsonite, the ratio of said gilsonite to said aldrin ranging between 1:2 and 5:1.

11. An insecticidal composition comprising a solid solution of dieldrin and 5% to 60% by weight gilsonite, the ratio of gilsonite to dieldrin ranging between 1:2 and 5:1.

References Cited in the file of this patent

UNITED STATES PATENTS

| | | |
|---|---|---|
| 1,226,889 | Jacobs | May 22, 1917 |
| 1,302,090 | Reeves | Apr. 29, 1919 |
| 1,362,241 | Duffin | Dec. 14, 1920 |
| 2,146,739 | Heath | Feb. 14, 1939 |
| 2,296,401 | Perkins | Sept. 22, 1942 |
| 2,489,228 | Rudd | Nov. 22, 1949 |
| 2,580,025 | Holmes | Dec. 25, 1951 |
| 2,581,295 | Redfarn | Jan. 1, 1952 |
| 2,595,217 | Parr et al. | May 6, 1952 |
| 2,627,488 | Zakheim | Feb. 3, 1953 |

OTHER REFERENCES

"Handbook of Aldrin, Dieldrin and Endrin," Shell Chem. Corp., 1954 (122 pp.), esp. pp. 23–28, 51–59 and 71–75.